US010289745B2

(12) United States Patent
Lection et al.

(10) Patent No.: US 10,289,745 B2
(45) Date of Patent: May 14, 2019

(54) INDEPENDENTLY REFRESHING A PLURALITY OF PORTLETS IN A PORTAL PAGE BY USING A REFRESH TAG EMBEDDED IN PORTLET MARKUP IN EACH PORTLET TO CALL A REFRESH SERVLET TO WRITE A REFRESH CONTROLLER

(75) Inventors: David B. Lection, Raleigh, NC (US);
Eric L. Masselle, Raleigh, NC (US);
Mohamad R. Salahshoor, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 884 days.

(21) Appl. No.: 13/424,882

(22) Filed: Mar. 20, 2012

(65) Prior Publication Data

US 2012/0179985 A1    Jul. 12, 2012

Related U.S. Application Data

(63) Continuation of application No. 11/170,916, filed on Jun. 30, 2005, now Pat. No. 8,214,731.

(51) Int. Cl.
*G06F 17/30*    (2006.01)

(52) U.S. Cl.
CPC .... *G06F 17/3089* (2013.01); *G06F 17/30011* (2013.01)

(58) Field of Classification Search
CPC ........................ G06F 17/30011; G06F 17/3089

(Continued)

(56) References Cited

U.S. PATENT DOCUMENTS 6,327,628 B1    12/2001  Anuff et al.
6,567,843 B1     5/2003  Schumacher
(Continued)

FOREIGN PATENT DOCUMENTS

CN      1892592 A    1/2007
CN    101176095 B    5/2010
(Continued)

OTHER PUBLICATIONS

"A process for the blending of web content," Research Disclosure 4321174, Apr. 2000, pp. 778-779.
(Continued)

*Primary Examiner* — Cesar B Paula
*Assistant Examiner* — Yahao Chen
(74) *Attorney, Agent, or Firm* — Cuenot, Forsythe & Kim, LLC

(57) ABSTRACT

Embodiments of the present invention address deficiencies of the art in respect to portlet content refreshing and provide a novel and non-obvious method, system and apparatus for independently refreshing portlet content in a portal view. In an embodiment of the invention, a system for refreshing portlet content in a portal view can include a portal server configured to render a portal page, a portlet aggregator configured to provide portlet markup for different portlets in different refresh controllers having independently refreshable portions, and a refresh servlet coupled to the portlet aggregator that includes programming to configure the portal page with the different refresh controllers.

15 Claims, 2 Drawing Sheets

(58) Field of Classification Search
USPC .................................................. 715/200, 760
See application file for complete search history.

(56) References Cited

U.S. PATENT DOCUMENTS

| | | | |
|---|---|---|---|
| 6,677,964 B1 | 1/2004 | Nason et al. | |
| 6,735,586 B2 | 5/2004 | Timmons | |
| 6,738,804 B1 * | 5/2004 | Lo ..................... | G06F 17/30905 707/E17.121 |
| 7,130,812 B1 * | 10/2006 | Iyer et al. ..................... | 705/7.11 |
| 7,146,563 B2 | 12/2006 | Hesmer et al. | |
| 7,162,717 B1 * | 1/2007 | Harris .......................... | 717/168 |
| 7,228,496 B2 | 6/2007 | Hamada | |
| 7,349,968 B2 | 3/2008 | Johnson | |
| 7,451,194 B2 | 11/2008 | Bowser et al. | |
| 7,523,401 B1 | 4/2009 | Aldridge | |
| 7,636,881 B2 | 12/2009 | Lection et al. | |
| 7,640,512 B1 * | 12/2009 | Appling ............ | G06F 17/30905 715/760 |
| 7,756,982 B2 | 7/2010 | Johnson | |
| 7,827,494 B1 * | 11/2010 | Hedayatpour et al. ....... | 715/742 |
| 8,214,731 B2 | 7/2012 | Lection et al. | |
| 2002/0007321 A1 | 1/2002 | Burton | |
| 2002/0087667 A1 | 7/2002 | Andersen | |
| 2002/0124022 A1 | 9/2002 | Yoo | |
| 2002/0138624 A1 | 9/2002 | Esenther | |
| 2002/0198903 A1 | 12/2002 | Robison | |
| 2003/0001888 A1 * | 1/2003 | Power ..................... | H04L 29/06 715/744 |
| 2003/0004272 A1 * | 1/2003 | Power ..................... | H04L 29/06 525/192 |
| 2003/0020671 A1 * | 1/2003 | Santoro ................. | G06F 3/0481 345/1.3 |
| 2003/0126558 A1 * | 7/2003 | Griffin .......................... | 715/513 |
| 2003/0145275 A1 * | 7/2003 | Qian et al. ..................... | 715/500 |
| 2003/0149722 A1 * | 8/2003 | Jolley et al. .................. | 709/203 |
| 2003/0167315 A1 | 9/2003 | Chowdhry et al. | |
| 2003/0167358 A1 | 9/2003 | Marvin et al. | |
| 2003/0187956 A1 * | 10/2003 | Belt et al. ..................... | 709/219 |
| 2003/0188163 A1 | 10/2003 | Fischer et al. | |
| 2004/0003096 A1 | 1/2004 | Willis | |
| 2004/0098451 A1 * | 5/2004 | Mayo .......................... | 709/203 |
| 2004/0098467 A1 * | 5/2004 | Dewey et al. ................ | 709/219 |
| 2004/0111671 A1 * | 6/2004 | Lu ..................... | G06F 17/30899 715/205 |
| 2004/0122971 A1 | 6/2004 | Joshi et al. | |
| 2004/0128620 A1 * | 7/2004 | Lund ................ | G06F 17/30873 715/234 |
| 2004/0177147 A1 * | 9/2004 | Joshi ................... | G06F 17/3089 709/227 |
| 2004/0199497 A1 * | 10/2004 | Timmons .......................... | 707/3 |
| 2004/0199541 A1 * | 10/2004 | Goldberg et al. .......... | 707/104.1 |
| 2004/0205555 A1 | 10/2004 | Hind et al. | |
| 2004/0230901 A1 | 11/2004 | Godwin et al. | |
| 2004/0243928 A1 | 12/2004 | Hesmer et al. | |
| 2005/0055634 A1 | 3/2005 | Burns et al. | |
| 2005/0108034 A1 * | 5/2005 | Musson et al. ................... | 705/1 |
| 2005/0108574 A1 | 5/2005 | Haenel et al. | |
| 2005/0108647 A1 * | 5/2005 | Musson et al. ............... | 715/744 |
| 2005/0108699 A1 * | 5/2005 | Olander et al. .............. | 717/166 |
| 2005/0187993 A1 * | 8/2005 | Selman et al. ............... | 707/204 |
| 2005/0188051 A1 * | 8/2005 | Sneh .......................... | 709/213 |
| 2005/0198195 A1 * | 9/2005 | Bowser ............. | G06F 17/30899 709/217 |
| 2005/0256906 A1 * | 11/2005 | Bales et al. ................ | 707/104.1 |
| 2005/0257172 A1 | 11/2005 | Bales et al. | |
| 2005/0262435 A1 | 11/2005 | Ramanujan | |
| 2005/0283734 A1 * | 12/2005 | Santoro ................. | G06F 3/0481 715/765 |
| 2006/0005137 A1 * | 1/2006 | Jolley .......................... | 715/742 |
| 2006/0015846 A1 | 1/2006 | Fraleigh et al. | |
| 2006/0034434 A1 | 2/2006 | Kashi | |
| 2006/0041637 A1 | 2/2006 | Jerrard-Dunne | |
| 2006/0047728 A1 * | 3/2006 | Kim .................. | G06F 17/30899 |
| 2006/0069714 A1 | 3/2006 | Blount et al. | |
| 2006/0080612 A1 | 4/2006 | Hayes et al. | |
| 2006/0095676 A1 | 5/2006 | Dzierzon et al. | |
| 2006/0129935 A1 | 6/2006 | Deinlein et al. | |
| 2006/0195779 A1 | 8/2006 | McElroy et al. | |
| 2006/0230062 A1 | 10/2006 | Roy-Chowdhury et al. | |
| 2007/0005731 A1 | 1/2007 | Lection et al. | |
| 2007/0006075 A1 | 1/2007 | Lection et al. | |
| 2007/0006084 A1 | 1/2007 | Lection et al. | |
| 2007/0055930 A1 | 3/2007 | Jerrard-Dunne et al. | |
| 2007/0055942 A1 | 3/2007 | Hesmer et al. | |
| 2007/0118794 A1 | 5/2007 | Hollander et al. | |
| 2007/0233871 A1 | 10/2007 | Fletcher et al. | |
| 2008/0134014 A1 | 6/2008 | Hind et al. | |
| 2008/0270929 A1 | 10/2008 | Bohn et al. | |

FOREIGN PATENT DOCUMENTS

| | | |
|---|---|---|
| EP | 1899874 A1 | 3/2008 |
| JP | 2003006158 A | 1/2003 |
| JP | 2009500703 A1 | 1/2009 |
| JP | 4791542 B2 | 10/2011 |
| WO | 02084534 A | 10/2002 |
| WO | 2005013579 A1 | 2/2005 |
| WO | 2007003496 A1 | 1/2007 |
| WO | 2007003497 A1 | 1/2007 |

OTHER PUBLICATIONS

Pierce, M., et al., "Interoperable Web Services for Computational Portals," IEEE, Supercomputing, ACM/IEEE 2002 Conference, 13 pgs.

Ginsburg, M., "The Catacomb Project: Building a User-Centered Portal the Conversational Way," WIDM '02, Nov. 8, 2002, pp. 84-87.

Donnelly, V., et al., "Community Portals Through Communitization," CCU '03, Nov. 10-11, 2003, pp. 9-14.

Bellas, F., et al., "A Flexible Framework for Engineering 'My' Portals," WWW 2004, May 17-22, 2004, ACM, pp. 234-242.

"How to Update Portlet Information Every X Seconds—Stock Ticker . . . Weather Updates . . . ," [online] Google Groups, Enterprise Portals & JSR 168 Portlets, Feb. 23, 2005,[retrieved Sep. 5, 2006] retrieved from the Internet: <http://groups.google.com/group/portlet/browse-thread/1b1bb18b98516c2 . . . >, 3 pgs.

Ziebold, G., et al., "Asynchronous Rendering of Portlet Content with AJAX Technology," Sun Developer Network (SDN) [Online] Jun. 6, 2005, XP002397762 [retrieved Sep. 5, 2006] retrieved from the Internet: <http://developers.sun.com/prodtech/por talserver/reference/techart/asy nch_rendering.html>, 3 pgs.

Lupi, R., "Refreshing the Content," [online] ZOPE.org, Oct. 7, 2004 [retrieved Sep. 5, 2006] retrieved from the Internet: <https://mail.zope.org/pipermail/zope/2004-October/153950.html>, 1 pg.

"Developing Portlets," [online] BEA Systems, Apr. 1, 2006 [retrieved Sep. 5, 2006] XP002397765, retrieved from the Internet: <e-docs.BEA.com>, 175 pgs.

"Optimizing and minimizing portlet round trips to a portal server," Research Disclosure 449086, Sep. 2001, XP007128940, 3 pgs.

WIPO Appln. PCT/EP2006/063283, International Search Report, dated Oct. 31, 2006, 3 pg.

WIPO Appln. PCT/EP2006/063283, International Preliminary Report on Patentability, dated Jan. 9, 2008, 7 pg.

U.S. Appl. No. 11/170,916, Non-Final Office Action, dated Dec. 26, 2007, 10 pg.

U.S. Appl. No. 11/170,916, Final Office Action, dated May 12, 2008, 13 pg.

U.S. Appl. No. 11/170,916, Examiner's Answer to Appeal Brief, Jan. 22, 2009, 15 pg.

U.S. Appl. No. 11/170,916, Decision on Appeal, Aug. 10, 2011, 9 pg.

U.S. Appl. No. 11/170,916, Decision on Reconsideration Request, dated Dec. 2, 2011, 5 pg.

U.S. Appl. No. 11/170,916, Notice of Allowance, dated Feb. 29, 2012, 8 pg.

(56) References Cited

OTHER PUBLICATIONS

WIPO Appln. PCT/EP2006/063285, International Search Report, dated Sep. 21, 2006, 3 pg.
WIPO Appln. PCT/EP2006/063285, International Preliminary Report on Patentability, dated Jan. 9, 2008, 7 pg.
U.S. Appl. No. 11/171,120, Non-Final Office Action, dated Nov. 26, 2007, 9 pg.
U.S. Appl. No. 11/171,120, Non-Final Office Action, dated May 28, 2008, 10 pg.
U.S. Appl. No. 11/171,120, Final Office Action, dated Apr. 28, 2009, 5 pg.
U.S. Appl. No. 11/171,120, Notice of Allowance, dated Aug. 10, 2009, 4 pg.
Levy et al., "Improving Understanding of website Privacy Policies with Fine-Grained Policy Anchors," Proc. of 14th Int'l. Conf.on World Wide Web, ACM, 2005, pp. 480-488.
Diaz, et al., "Invoking Web Applications from Portals: Customisation Implications," in Adaptive Hypermedia and Adaptive Web-Based Systems, pp. 75-84. Springer Berlin Heidelberg, 2004.
Diaz et al., "Improving Portal Interoperability through Deep Annotation," ACM, May 2005, pp. 372-381.
Allan et al., "Portals and Portlets 2003," In Proc. NeSC Workshop, pp. 14-17. 2004, retrieved from the Internet: <http://www.nesc.ac.uk/technical_papers/UKeS-2004-06>, pp. 1-40.
Diaz et al., "Portal Syndication: Raising Variability Concerns," ACM, Nov. 2005, pp. 627-659.
Wang et al., "Portlet, WSRP and Application," in 2nd Int'l. Conf. on Semantics, Knowledge and Grid, SKG'06, IEEE, 2006, 55 pg.
Schaeck, "Web Services for Remote Portals (WSRP) Whitepaper,"Schaeck, Oasis Web Services for Remote Portlets TC, Sep. 22, 2002, 18 pg.
U.S. Appl. No. 11/170,981, Final Office Action, dated Oct. 17, 2014, 9 pg.
U.S. Appl. No. 11/170,981, Non-Final Office Action, dated Feb. 8, 2008, 9 pg.
U.S. Appl. No. 11/170,981, Final Office Action, dated Jul. 29, 2008, 9 pg.
U.S. Appl. No. 11/170,981, Non-Final Office Action, dated Mar. 9, 2009, 8 pg.
U.S. Appl. No. 11/170,981, Final Office Action, dated Aug. 7, 2009, 11 pg.
U.S. Appl. No. 11/170,981, Non-Final Office Action, dated Apr. 2, 2010, 6 pg.
U.S. Appl. No. 11/170,981, Non-Final Office Action, dated Nov. 23, 2010, 9 pg.
U.S. Appl. No. 11/170,981, Final Office Action, dated Apr. 27, 2011, 11 pg.
U.S. Appl. No. 11/170,981, Examiner's Answer to Appeal Brief, dated Aug. 10, 2011, 13 pg.
U.S. Appl. No. 11/170,981, Decision on Appeal, May 7, 2014, 15 pg.
U.S. Appl. No. 11/170,981, Decision on Request for Rehearing, Jul. 29, 2014, 5 pg.
Woychowsky, Hidden Frames Facilitate Client-Side Caching, Oct. 1, 2002, retrieved from the Internet: <http://articles.techrepublic.com.com/5100-10878_11-1044658.html>, pp. 1-3.

* cited by examiner

INDEPENDENTLY REFRESHING A PLURALITY OF PORTLETS IN A PORTAL PAGE BY USING A REFRESH TAG EMBEDDED IN PORTLET MARKUP IN EACH PORTLET TO CALL A REFRESH SERVLET TO WRITE A REFRESH CONTROLLER

CROSS-REFERENCE TO RELATED APPLICATIONS

This application is a Continuation of U.S. application Ser. No. 11/170,916, filed on Jun. 30, 2005.

BACKGROUND OF THE INVENTION

Field of the Invention

The present invention relates to the field of portal environment management and more particularly to refreshing portlet content within a portal view.

Description of the Related Art

Distributing content about large computer communications networks is not without its challenges. In particular, the quantity of content available for distribution in a computer communications network often varies proportionally to the size of the computer communications network. At the extreme, the Internet hosts a vast quantity of content not easily accessible by most end-users. Portals represent a sensible solution to the problem of aggregating content through a channel paradigm in a single, network-addressable location. In consequence, portals have become the rage in content distribution.

Portlets are the visible active components included as part of portal pages. Similar to the graphical windows paradigm of windowing operating systems, each portlet in a portal occupies a portion of the portal page through which the portlet can display associated content from a portlet channel. Portlets are known to include both simple applications such as an electronic mail client, and also more complex applications such as forecasting output from a customer relationship management system. The prototypical portlet can be implemented as server-side scripts executed through a portal server.

From the end-user perspective, a portlet is a content channel or application to which the end-user can subscribe. By comparison, from the perspective of the content provider, a portlet is a means through which content can be distributed in a personalized manner to a subscribing end-user. Finally, from the point of view of the portal, a portlet merely is a component which can be rendered within the portal page. In any case, by providing one or more individually selectable and configurable portlets in a portal, portal providers can distribute content and applications through a unified interface in a personalized manner according to the preferences of the end-user.

Portal servers are computer programs which facilitate the distribution of portal based Web sites on the public Internet or a private intranet. Importantly, it will be recognized by one of ordinary skill in the art that the signature characteristic of all conventional portal servers can include the aggregation of content from several portlet applications within a single distributable page in a uniform manner. To that end, each portlet application within the portal page can be represented by a portlet user interface distributed by the portal server to requesting client computing devices.

Portals display an aggregation of markup that can, and frequently does, originate from multiple content sources. The performance and availability of any one of these sources can have a profound effect upon the end user experience with a portal, since the entire portal display must be aggregated prior to rendering the portal in a client viewer. Specifically, aggregation complicates the notion of refresh, and the Web based interface of a portal can compound matters further. In this regard, portlets running in the portal view that require a timely refresh cannot do so without interrupting the display of neighboring portlets. This type of interruption can be distracting and a source of frustration for the end user.

BRIEF SUMMARY OF THE INVENTION

Embodiments of the present invention address deficiencies of the art in respect to portlet content refreshing and provide a novel and non-obvious method, system and apparatus for independently refreshing portlet content in a portal view. In an embodiment of the invention, a system for refreshing portlet content in a portal view can include a portal server configured to render a portal page, a portlet aggregator configured to provide portlet markup for different portlets in different refresh controllers having independently refreshable portions, and a refresh servlet coupled to the portlet aggregator that includes programming to configure the portal page with the different refresh controllers.

In one aspect of the invention, the different refresh controllers can be linked to the portal page through corresponding hidden frames disposed in the portal page. Moreover, each of the different refresh controllers can include a script programmed to write contained portlet markup to an element in the portal page responsive to a triggering event, such as an on load event. Finally, the portlet markup for the different portlets each can include at least one refresh tag. The refresh tag can include an element type, an element identifier, an address for refreshable content for an element in the portlet markup associated with the element identifier, and a refresh rate. Also, the portlet markup for the different portlets each can include one or more refresh tags for different portions of the portlet markup.

In another embodiment can provide for a method for refreshing portlet content in a portal view. The method can include receiving a call from a refresh tag in portlet markup for a portlet among portlets in the portal view. Responsive to the receipt of the call, a refresh controller can be generated for the portlet markup. A script can be embedded in the refresh controller, the script including code enabled to provide content in the refresh controller to the portal page. The refresh controller can be linked to a hidden frame in the portal page. Finally, the hidden frame can be provided to an aggregator for assembly into the portal page.

Notably, the method can include extracting a refresh rate from the call from the refresh tag. In this regard, the embedding step can include enabling the code to periodically refresh the content in the refresh controller at a rate consistent with the refresh rate. Also, the extracting step further can include extracting a push type and a push identifier for a portion of the portlet markup from the call from the refresh tag. In this case, the embedding step can include selecting the script for embedding in the refresh controller according to a template corresponding to the push type. Moreover, the embedding step further can include enabling the code to periodically refresh content for the portion in the refresh controller indicated by the push identifier at a rate consistent with the refresh rate.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for independently refreshing portlet content in a portal view. In an embodiment of the invention, a refresh tags specifying different refresh intervals can be included in correspondingly different portlet content. The refresh tags can be separately processed in a refresh servlet to produce separate refresh controller documents, each linked to a hidden frame in the portal view, and each including a script controlling the refreshing of corresponding portlet content. Subsequently, an aggregator for the portal view can include the portlet content in each hidden frame in the portal view, and the aggregator can periodically refresh the different portlet content in the portal view independently accordingly to the specified, different intervals. In this way, different elements of the portal view can be refreshed at different intervals without interfering with the display of neighboring elements in the portal view.

Figure 1:
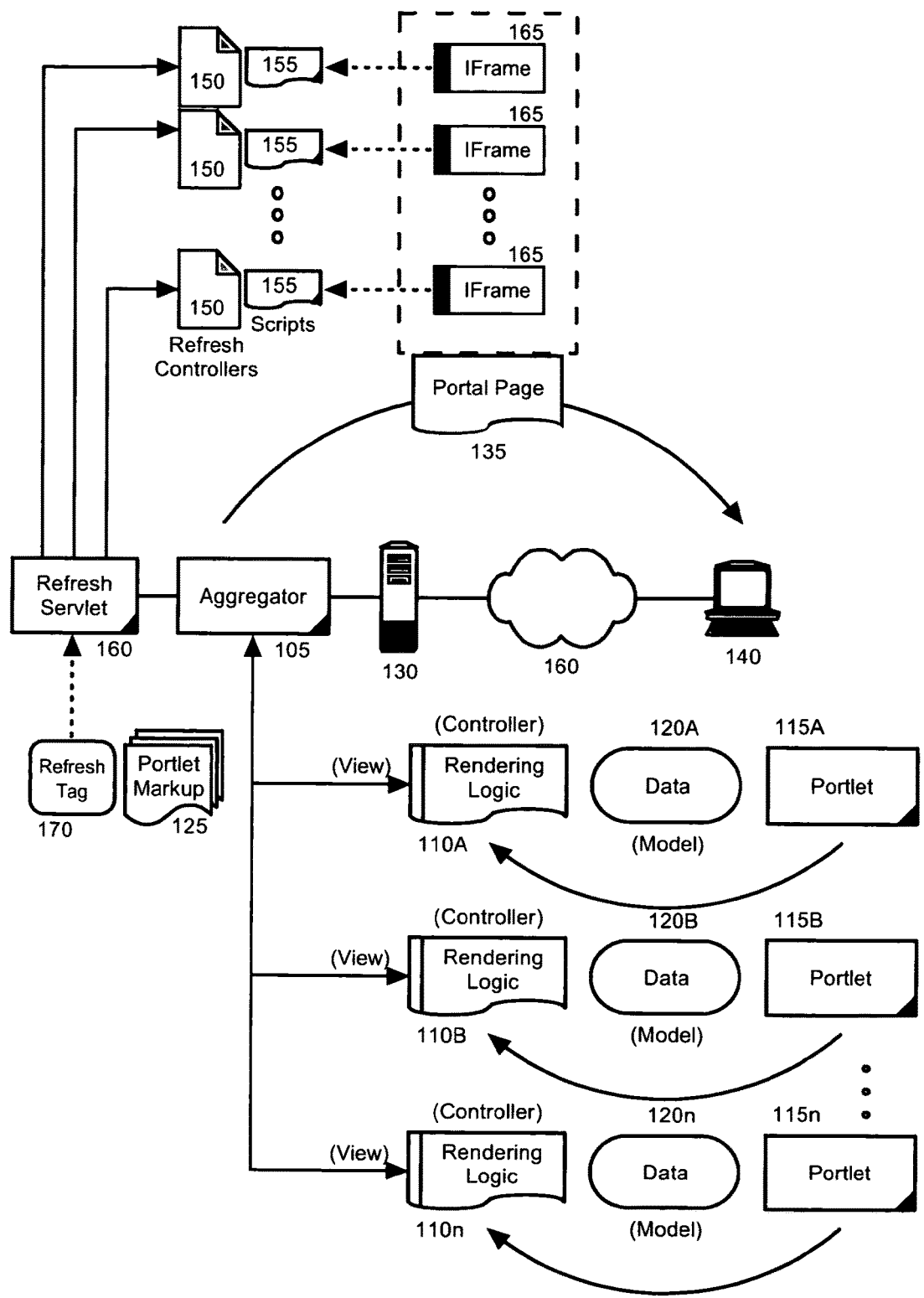
FIG. 1 is a schematic illustration of a portal environment configured to accommodate the independent refreshing of portlet content in a portal view; and, FIG. 2 is a flow chart illustrating a method for independently refreshing portlet content in a portal view.

In more particular illustration, FIG. 1 is a schematic illustration of a portal server system which has been configured to independently refresh portlet content in a portal view. The portal server system can include a portal page 135 communicatively coupled to a selection of portlet applications 115A, 115B, 115n through a portal server 130. Each portlet application 115A, 115B, 115n can produce a view based upon portlet data 120A, 120B, 120n in the form of portlet markup 125 through corresponding rendering logic 110A, 110B, 110n. Notably, the rendering logic 110A, 110B, 110n can be active markup such as a JSP, in which logical scriptlets can be embedded to produce specific markup language tags.

A portlet aggregator 105 can be coupled to each portlet application 115A, 115B, 115n to receive the portlet markup 125 and to aggregate the portlet markup 125 into view in the portal page 135. By aggregation, it is meant that the individual markup language blocks produced by each portlet 115A, 115B, 115n can be combined into a single cohesive markup language document configured for distribution to and use within a conventional content browser. In this regard, the portal page 135 can be disposed in the portal server 130 from which the portal 135 can be accessed by client content browsing devices 140 over a computer communications network 160 such as a local computer communications network, for instance a private intranet, or a global computer communications network, for instance the public Internet.

In accordance with an embodiment of the present invention, a refresh tag 170 can be embedded in portlet markup 125 to indicate that at least a portion of the content of portlet markup 125 is to be refreshed at a specified interval. In this regard, the refresh tag 170 can be incorporated in the portlet markup 125 multiple times to achieve multiple independent refreshing of different elements within the portlet markup 125 of a portlet. The refresh tag 170 can include several parameters helpful in controlling the independent refreshing of a specified portion of the portlet markup 125.

For example, the parameters can include a push type indicating the type of element in the portlet markup 125 which is to be refreshed and a push identifier for uniquely identifying the element to be refreshed. Push types can include a popup window of the portlet markup 125, a field within a form in the portlet markup 125, and a document indicating the visual markup elements of the portlet markup 125, to name only a few. The parameters also can include a network or file system address for the source of the content to be refreshed in the uniquely identified element in the portlet markup 125. Finally, the refresh tag 170 can include a refresh rate indicating how often the content for the uniquely identified element in the portlet markup 125 is to be refreshed. The refresh rate can include a specified integer rate, or a formulaically derived rate.

A refresh servlet 160 can be coupled to the aggregator 105. The refresh tag 170 can call the refresh servlet 160 to write a corresponding refresh controller 150 utilizing parameters provided by the refresh tag 170. The refresh controller 150 can be a document containing visual markup such as hypertext markup language (HTML). The refresh controller 150 can include a hidden frame, such as a hidden inline frame. The inline frame can reference the network or file system address for the source of the content to be refreshed in the uniquely identified element in the portlet markup 125 as noted by the refresh tag 170.

The refresh controller 150 also can include a script 155 to write the portlet markup 125 of the refresh controller 150 to a designated element in the portal page 135. The script 155 can be templated and selected according to the push type indicated by the refresh tag 170 and can be executed when an "on load" triggering event occurs in the refresh controller 150. Finally, the aggregator 105 can configure the portal page 135 with hidden frames 165, each hidden frame referring to one of the refresh controllers 150. To that end, the script 155 can reference a corresponding "span" in a corresponding refresh controller 150 so as to cause the refreshing of the content in the designated element in the portal page 135 with the refreshed content incorporated within the hidden frame 165.

Optionally, one refresh controller 150 can be created for the entire portal page 135 where the refresh controller 150 contains all of the scripts 155 and hidden frames fore each refreshed element in all portlets 115A, 115B, 115n on the portal page 135. Alternatively, one refresh controller 150 can be created for each portlet 115A, 115B, 115n, where each refresh controller 150 contains all of the scripts 155 and all of the hidden frames for each refreshed element within the portlet 115A, 115B, 115n. Finally, as yet another alternative, one refresh controller 150 can be created for each refreshed element in a portlet 115A, 115B, 115n in a portal page 135.

In consequence of the foregoing arrangement, each of the portlets 115A, 115B, 115C can provide its corresponding markup to a refresh controller 150 rather than a single document (the portal page 135, itself). Further, each of the refresh controllers 150, can write its respective content—when that content is ready to render according to the refresh rate specified by a corresponding refresh tag 170—to an element of the portal page 135. Since no one of the portlets 115A, 115B, 115C need wait for any other of the portlets 115A, 115B, 115C to construct markup, the markup stream for the portal page 135 can be displayed immediately and each of the portlets 115A, 115B, 115C can enjoy independent refreshing in the portal view 135.

Figure 2:
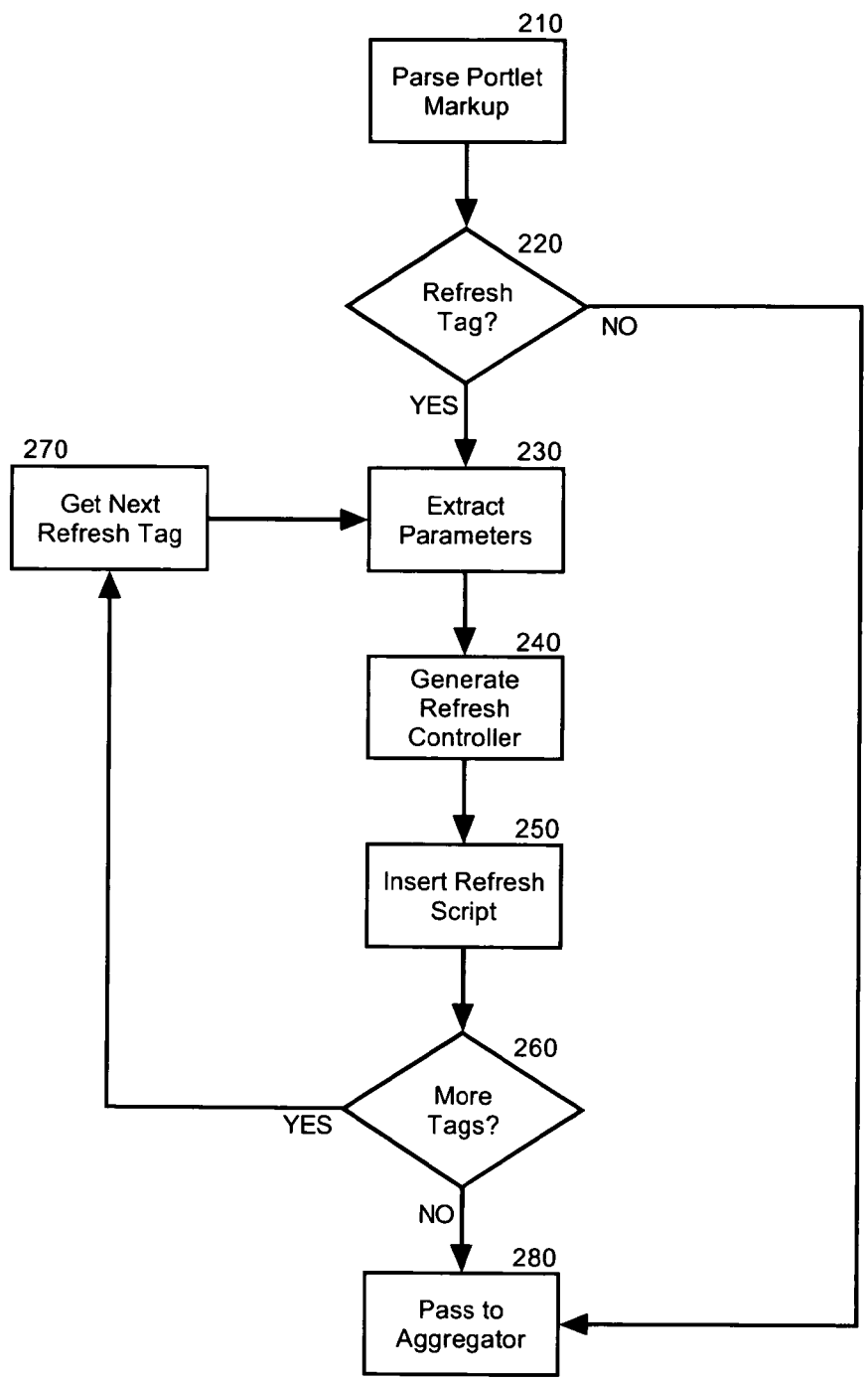

In further illustration of the operation of the refresh servlet 160 of the portal system of FIG. 1, FIG. 2 is a flow chart illustrating a method for independently refreshing portlet content in a portal view. Beginning in block 210, a refresh call can be received for refreshing content in a portlet. In block 220, parameters for the refresh call can be extracted. Specifically, a push type, push identifier, content source and refresh rate can be extracted for the refresh tag. Subsequently, in block 230 a refresh controller can be generated for at least a portion of the portlet markup as designated by the push identifier and push type. To that end, the designated portion of the portlet markup can range from a mere field in a form in the portlet markup, to an entire HTML document in the portlet markup.

In any case, in block 240, a refresh script can be included in the refresh controller, which refresh script can cause the refreshing of the content for the designated portion of the portlet market at the specified refresh rate. In decision block 250, it can be determined if additional refresh calls remain to be processed. If so, the process can continue through block 260 in which a next refresh tag can be selected for processing and the process can repeat in blocks 230 through 260. When no further refresh calls remain to be processed in the portlet markup, in block 270 the portlet markup can be passed to the aggregator for aggregation into the portal view.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The invention claimed is:

1. A method, performed within a portal server, of aggregating a portal page including a plurality of different portlets, comprising:
    refreshing, independently, each of the plurality of different portlets using a plurality of different refresh controllers, wherein
    each of the plurality of different refresh controllers
        is, respectively, associated with one of the plurality of different portlets, and
        controls a refresh rate of the one of the plurality of different portlets,
    the refresh rate for a particular portlet within the plurality portlets is derived using a refresh tag embedded in portlet markup, and
    the refresh tag calls a refresh servlet to write a particular refresh controller associated with the particular portlet using parameters provided by the refresh tag.

2. The method of claim 1, wherein
    a refresh rate associated with a first of the plurality of different portlets is independent of a refresh rate associated with a second of the plurality of different portlets.

3. The method of claim 1, wherein
    each of the plurality of different refresh controllers is linked, respectively, to a different one of a plurality of hidden frame within the portal page.

4. The method of claim 3, wherein
    the plurality of hidden frames reference addresses of content within the portlets to be refreshed.

5. The method of claim 1, further comprising
    pushing the portal page to a client computer system.

6. The method of claim 1, wherein
    each of the plurality of different refresh controllers includes a refresh script, and
    the refresh script controls the refresh rate of the portlet.

7. The method of claim 1, wherein
    each of the plurality of different refresh controllers, consistent with the refresh rate associated with the respective refresh controller, writes content to the portal page.

8. The method of claim 1, wherein
    a particular one of the plurality of different portlets includes a plurality of refreshed elements, and
    a refresh controller associated with the particular one of the plurality of different portlets is linked with a plurality of hidden frames respectively associated with the plurality of refreshed elements.

9. A method, performed within a portal server, of aggregating a portal page including a plurality of different portlets, comprising:

refreshing, independently, each of the plurality of different portlet elements using a plurality of different refresh controllers, wherein each of the plurality of different refresh controllers
is, respectively, associated with one of the plurality of different portlet elements, and
controls a refresh rate of the one of the plurality of different portlet elements, a portlet element is a refreshable element within a portlet, the refresh rate for a particular portlet within the plurality portlets is derived using a refresh tag embedded in portlet markup, and the refresh tag calls a refresh servlet to write a particular refresh controller associated with the particular portlet using parameters provided by the refresh tag.

10. The method of claim 9, wherein
a refresh rate associated with a first of the plurality of different portlet elements is independent of a refresh rate associated with a second of the plurality of different portlet elements.

11. The method of claim 9, wherein
each of the plurality of different refresh controllers is linked, respectively, to a different one of a plurality of hidden frames within the portal page.

12. The method of claim 11, wherein
the plurality of hidden frames reference addresses of content within the portlets to be refreshed.

13. The method of claim 9, further comprising
pushing the portal page to a client computer system.

14. The method of claim 9, wherein
each of the plurality of different refresh controllers includes a refresh script, and
the refresh script controls the refresh rate of the portlet element.

15. The method of claim 9, wherein
each of the plurality of different refresh controllers, consistent with the refresh rate associated with the respective refresh controller, writes content to the portal page.

* * * * *